United States Patent
Ge et al.

(10) Patent No.: US 8,913,496 B2
(45) Date of Patent: Dec. 16, 2014

(54) SYSTEM AND METHOD FOR DYNAMICALLY POLICING NETWORK TRAFFIC BASED ON EGRESS QUEUE STATUS

(75) Inventors: An Ge, Plano, TX (US); Jih-Tsang Leu, Plano, TX (US); Atiya Suhail, Plano, TX (US)

(73) Assignee: Alcatel Lucent, Boulogne-Billancourt (FR)

( * ) Notice: Subject to any disclaimer, the term of this patent is extended or adjusted under 35 U.S.C. 154(b) by 1190 days.

(21) Appl. No.: 12/751,534

(22) Filed: Mar. 31, 2010

(65) Prior Publication Data
US 2011/0242973 A1 Oct. 6, 2011

(51) Int. Cl.
| | |
|---|---|
| H04L 1/00 | (2006.01) |
| H04L 12/26 | (2006.01) |
| G06F 15/16 | (2006.01) |
| G06F 15/173 | (2006.01) |
| H04L 12/801 | (2013.01) |
| H04L 12/835 | (2013.01) |
| H04L 12/813 | (2013.01) |
| H04L 12/863 | (2013.01) |

(52) U.S. Cl.
CPC ............... *H04L 47/30* (2013.01); *H04L 47/10* (2013.01); *H04L 47/20* (2013.01); *H04L 47/627* (2013.01)
USPC ............................. 370/235; 709/232; 709/238

(58) Field of Classification Search
CPC ....... H04L 47/50; H04L 47/52; H04L 47/521; H04L 47/522; H04L 47/524; H04L 47/525; H04L 47/527; H04L 47/528; H04L 47/54; H04L 47/56; H04L 47/562; H04L 47/564; H04L 47/566; H04L 47/568; H04L 47/58; H04L 47/60; H04L 47/62; H04L 47/6205; H04L 47/621; H04L 47/6215; H04L 47/622; H04L 47/6225; H04L 47/523; H04L 47/6235; H04L 47/624; H04L 47/6245; H04L 47/625; H04L 47/6255; H04L 47/626; H04L 47/6265; H04L 47/627; H04L 47/6275; H04L 47/628; H04L 47/6285; H04L 47/629; H04L 47/6295
USPC ......... 370/400, 401, 428, 429, 437, 468, 469, 370/203, 235, 237, 241, 252, 253, 254, 255, 370/256, 257, 258, 351, 356; 709/224, 232, 709/238, 239, 242, 243
See application file for complete search history.

(56) References Cited

U.S. PATENT DOCUMENTS

| | | | | |
|---|---|---|---|---|
| 5,164,938 | A * | 11/1992 | Jurkevich et al. | 370/231 |
| 6,901,052 | B2 * | 5/2005 | Buskirk et al. | 370/235 |
| 7,286,552 | B1 * | 10/2007 | Gupta et al. | 370/413 |
| 2005/0265361 | A1 * | 12/2005 | Quilty et al. | 370/401 |
| 2006/0053117 | A1 * | 3/2006 | McAlpine et al. | 707/10 |

* cited by examiner

*Primary Examiner* — Kwang B Yao
*Assistant Examiner* — Adam Duda
(74) *Attorney, Agent, or Firm* — Hitt Gaines, PC

(57) ABSTRACT

A system and method for dynamically policing network traffic based on egress queue status and a network node incorporating the system or the method. In one embodiment, the system includes: (1) a policing engine configured to receive egress queue status information and (2) a pushback calculator associated with the policing engine and configured to produce a reduction calculation based on the egress queue status information, the policing engine further configured to produce a throttle signal to reduce a traffic policing rate of an ingress queue.

17 Claims, 2 Drawing Sheets

SYSTEM AND METHOD FOR DYNAMICALLY POLICING NETWORK TRAFFIC BASED ON EGRESS QUEUE STATUS

TECHNICAL FIELD

This application is directed, in general, to network management and, more specifically, to a system and method for dynamically policing network traffic based on egress queue status.

BACKGROUND

As the next generation of networking occurs, organizations are becoming increasingly reliant on their networks to deliver Internet Protocol (IP) communications and mission-critical information. With the trends towards IP telephony and converged applications becoming a reality, there is now a greater need to incorporate QoS into the network infrastructure. QoS comprises a set of mechanisms that gives priority to delay-sensitive applications and makes the network more efficient and reliable for all applications.

QoS is designed to prioritize traffic and allocate network resources so that information arrives smoothly and predictably at its destination. It enables traffic to be grouped into categories based on common characteristics, allowing prioritization and services to be applied at the user or application level. Priority levels range from "mission-critical" (highest priority) to "best effort" (lowest priority). While over-provisioning bandwidth is an alternative to using QoS, and is an effective way to manage bandwidth in some networks, it cannot provide any guarantees that delay-sensitive traffic, such as voice and video, will arrive at its destination as the sender intends. QoS can make more efficient use of bandwidth and traffic management without adding capacity, and is therefore an attractive way to meet the needs of delay-sensitive traffic and to make better use of enterprise resources (e.g., bandwidth and equipment investment).

QoS depends upon the per-hop behavior (PHB) of the packets that constitute the traffic the network conveys. In turn, the PHB depends upon the transit time of the packets as they cross various network nodes in their journeys across the network. Unfortunately, nodes can become overutilized and congested, making the PHB more difficult to predict and manage, and degrading QoS.

SUMMARY

One aspect provides a system for dynamically policing network traffic based on egress queue status. In one embodiment, the system includes: (1) a policing engine configured to receive egress queue status information and (2) a pushback calculator associated with the policing engine and configured to produce a reduction calculation based on the egress queue status information, the policing engine further configured to produce a throttle signal to reduce a traffic policing rate of an ingress queue.

Another aspect provides a method of dynamically policing network traffic based on egress queue status. In one embodiment, the method includes: (1) receiving egress queue status information, (2) producing a reduction calculation based on the egress queue status information and (3) producing a throttle signal to reduce a traffic policing rate of an ingress queue.

Yet another aspect provides a network node. In one embodiment, the node includes: (1) a plurality of ingress queues, (2) a plurality of egress queues, (3) a policing engine configured to receive status information regarding the plurality of egress queues and (4) a pushback calculator associated with the policing engine and configured to produce a reduction calculation based on the egress queue status information for at least of the plurality of ingress queues, the policing engine further configured to produce a throttle signal to reduce a traffic policing rate of the at least one of the plurality of ingress queues.

BRIEF DESCRIPTION

Reference is now made to the following descriptions taken in conjunction with the accompanying drawings, in which.

DETAILED DESCRIPTION

Figure 1:
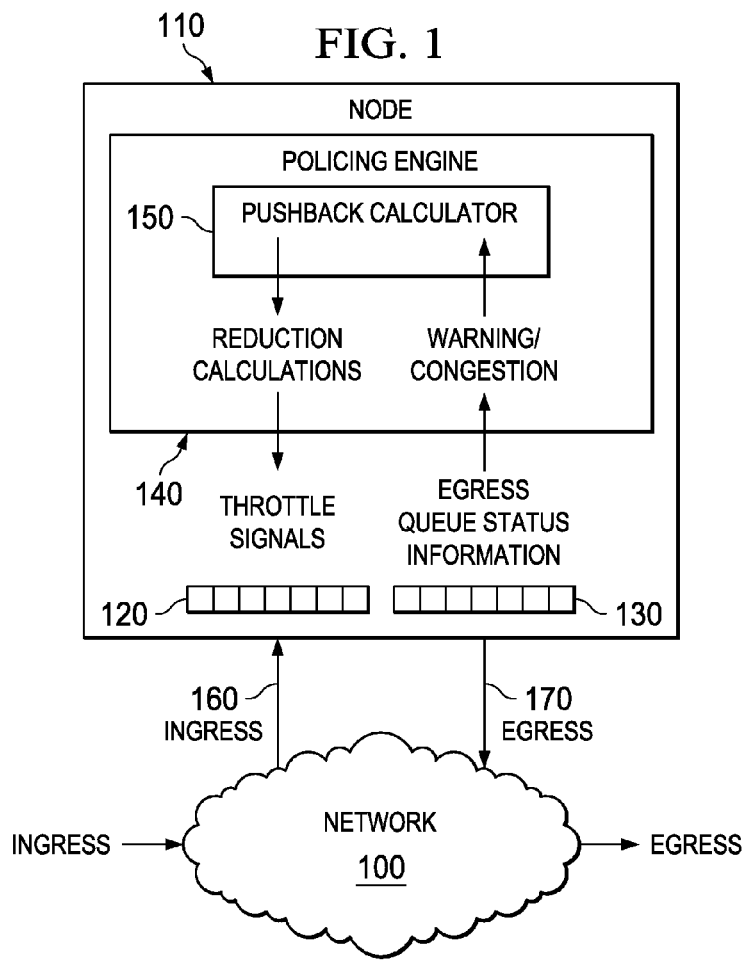
FIG. 1 is a block diagram of one embodiment of a network having a node in which a policing engine embodies a system or method for dynamically policing network traffic based on egress queue status constructed or carried out in accordance with the teachings herein.

Various conventional network architectures provide flow-based or class-based QoS mechanisms. Flow-based mechanisms include Integrated Services (IntServ or IS), which employs the Resource Reservation Protocol (RSVP) to make reservations of network resources for each specific flow of data through the network.

Class-based mechanisms include Differentiated Services (DiffServ or DS), sometimes referred to as "provisioned QoS." Instead of reserving resources for specific flows, DiffServ divides traffic into prioritized Classes Of Service (COSes) and then treats the classes as aggregate flows on a hop-by-hop basis. The current IP implementations of DiffServ defines eight COSes. To achieve this, DiffServ provides a standard way of encoding the existing type-of-service (TOS) field in an IP packet header as a DS byte, with the six most significant bits being defined as DSCPs. Additional information in the DS byte defines the PHB.

Compared to IntServ and RSVP, DiffServ requires less network overhead to implement. As a result, DiffServ has received widespread support among network equipment manufacturers, particularly those that manufacture equipment for larger networks. DiffServ works well in networks having routers from different manufacturers, as long as the routers support DiffServ.

Described herein are various embodiments of a system and method for dynamically policing network traffic based on egress queue status. The system and method typically operate with respect to at least some of the interfaces of at least some of the nodes of the network.

Many of the embodiments change the traffic policing rate at the ingress to a node based on the state of the output queues at the egress of the node to avoid congestion at the node. The policing rate is lowered when the egress starts to get congested and increased, perhaps back to a previous level, when the congestion at the egress reduces.

In some embodiments, the system and method employ a preconfigured high policing rate at the beginning and then monitor the state of one or more of output queues. In more specific embodiments, the system and method keep count of the packets entering in each output queue from each ingress interface. When the output queue on the egress reaches a warning watermark or a congestion watermark, the traffic policing rate on the ingress is reduced in proportion to the traffic it is sending to the congested output queue. When the congestion clears the policing rate at the egress is increased back in steps.

As a result, the system and method can provide a dynamic mechanism to control congestion based on current states of the output queues of one or more egress interfaces. This mechanism can apply to both real-time and non real-time traffic and works well with a DiffServ-based QoS. Unlike RSVP, the system and method do not require flow state information. Many embodiments of the system and method are scalable, making them especially attractive for large, complex networks, such as the Internet.

Various embodiments of the system and method will now be described in the specific context of a QoS environment that supports 14 traffic types. Table 1, below, shows one example of these 14 traffic types. These various embodiments will also be described in the specific context of a node that has six interfaces. Table 2, below, shows one example of the interfaces that such a node may have. Those skilled in the pertinent art should understand, however, that the teachings herein extend to other QoS environments and nodes employing different numbers and types of interfaces.

TABLE 1

Traffic Types Supported in Example QoS Environment

| Application Category | PHB |
|---|---|
| Routing and Network Control | CS6 |
| Distress Call<br>Evacuation Command<br>Critical Communication | EF |
| Voice - High | AF41 |
| Voice - Medium | AF42 |
| Voice - Low | AF43 |
| SIP signaling | CS3 |
| Vital Sensor Data - High | AF31 |
| Vital Sensor Data - Medium | AF32 |
| Vital Sensor Data - Low | AF33 |
| Application Category | PHB |
| Video - High | AF21 |
| Video - Medium | AF22 |
| Video - Low | AF23 |
| Database Synchronization | CS2 |
| Best Effort | DF (CS0) |

TABLE 2

Interfaces at Example Node

| Interface Types | Number of Interfaces |
|---|---|
| Ethernet | 2 |
| Backhaul | 1 |
| Mesh (Wi-Fi) | 2 |
| WiMAX | 1 |

Referring specifically to the node described in Table 2, one ingress and one egress queue is implemented for each traffic type on each interface, resulting in a total of 84 ingress and 84 egress queues. Two policing rates (low and high) are defined for each traffic type on each interface. The policing rates are configurable through management. In one embodiment, the highest policing rate is initially applied.

FIG. 1 is a block diagram of one embodiment of a network 100 having a node 110 having ingress queues 120 and egress queues 130 and a policing engine 140. The node 110 also embodies a system or method for dynamically policing network traffic based on egress queue status in the node 110 constructed or carried out in accordance with the teachings herein. In the embodiment of FIG. 1, the system is embodied in the policing engine 140 and includes a pushback calculator 150 that carries out a pushback process for dynamically policing network traffic based on egress queue status. As will be described in greater detail below, an ingress 160 of packets from a portion of the network 100 enters the ingress queues 120. Following processing in the node 110, the output queues 130 provide for an egress 170 of packets into a remainder of the network 100. The policing engine 140 receives information regarding the state of the egress queues 130 and invokes the pushback calculator 150 upon the indication of a warning, a congestion or any other state that may bear on the issue of dynamic policing. The pushback calculator 150 performs a pushback process that yields one or more reduction calculations. The policing engine 140 employs the one or more reduction calculations to generate one or more throttle signals to adjust policing with respect to the ingress queues 120.

The pushback process measures the rate of traffic coming in each egress queue from each ingress queue. In one embodiment, the traffic rate is measured using an exponential moving average (EMA), i.e.:

$$\text{Rate}(t) = \alpha * (N/T) + (1-\alpha) * \text{Rate}(t-T),$$

where N is the number of packets received in time interval T and $\alpha$ is a weighted value between 0 and 1.

In one embodiment, two watermarks are configured for each egress queue: a warning watermark and a congestion watermark. In a more specific embodiment, these watermarks are specified in terms of a percentage of overall queue length. When queue lengths exceed the warning or congestion watermark, one or more ingress queues are pushed back. In one specific embodiment, the one or more ingress queues are pushed back in proportion to the traffic they are sending to the affected egress queue.

To understand the process, a few notations should be described beforehand. As used hereinafter, $R_{i,j}^C$ is the ingress rate for traffic class C from ingress i to egress j. $R_{o,j}^C$ is the output rate of the egress queue for traffic class C on interface j. $R_{in,j}^C$ is the total traffic coming in egress queue for class C on interface j. $LQ_j^C$ is the length of the egress queue for traffic class C on interface j. $WT_j^C$ is the warning watermark for egress queue for traffic class C on interface j. $CT_j^C$ is the congestion watermark for egress queue for traffic class C on interface j $CT_j^C > WT_j^C$. $\text{Norm}_j^C$ is the normal watermark for egress queue for traffic class C on interface j. $\text{Norm}_j^C < WT_j^C$. $\text{RateReduction}_j^C$ is the amount by which the total traffic coming in egress queue (for traffic C interface j) be reduced. $\text{RateReduction}_j^C$ is the amount by which the traffic coming from ingress i to egress j for traffic class C be reduced. $\text{PMax}_i^C$ is the maximum police rate for traffic class C on ingress interface i. $\text{PMin}_i^C$ is the minimum police rate for traffic class C on ingress interface i. $\text{PCurrent}_i^C$ is the current police rate for traffic class C on ingress interface i.

In the described embodiment, all egress queues are monitored periodically, i.e., every t seconds. The time t is configurable through management. The default value is one second. In other embodiments, fewer than all egress queues are monitored. In still other embodiments, egress queues are monitored occasionally rather than periodically. In yet other embodiments, egress queues are monitored continually rather than continuously.

In the described embodiment, if the queue length $LQ_j^C$ of any queue is greater than the warning watermark $WT_j^C$ or the congestion watermark $CT_j^C$, a throttle signal is sent to each ingress queue that is sending traffic to the affected egress queue. The throttle signal is proportional to the ingress traffic rate $R_{i,j}^C$. The ingress traffic is policed until $LQ_j^C < Norm_i^C$. When the egress queue length falls below the returns to normal the policing rate is brought back in steps to its maximum value. Table 3, below, describes one embodiment of a pushback process.

TABLE 3

One Embodiment of a Pushback Process

Step 1: Compute the rate of traffic coming from each ingress queue, to each egress queue $R_{i,j}^C$.
Step 2: For each egress queue on each interface:
{
 Step 3: If $(LQ_j^C > WT_j^C$ or $LQ_j^C > CT_j^C)$
 {
  Step 3a: Calculate the total incoming traffic rate for this egress queue:

$$R_{in,j}^C = \sum_{i=1}^{n} R_{i,j}^C$$

where n is the total number of interfaces on the node.
  Step 3b: Compute the amount by which the input traffic $R_{in,j}^C$ should be reduced to control congestion:
   RateReduction$_j^C = R_{in,j}^C - \eta R_{o,j}^C$,
   where:

$$\eta = \frac{1}{1 - \frac{\text{congestionPushBackPercentage}}{100}} \text{ if } LQ_j^C > CT_j^C$$

$$\eta = \frac{1}{1 - \frac{\text{warningPushBackPercentage}}{100}} \text{ if } LQ_j^C > WT_j^C,$$

and where congestionPushBackPercentage and warningPushBackPercentage are configurable through management. The default values are 30% and 20% respectively.
  Step 3c: Compute the amount by which traffic from each ingress interface be reduced:

$$\text{RateReduction}_{i,j}^C = \frac{R_{i,j}^C}{R_{in,j}^C}(\text{RateReduction}_j^C).$$

Step 3d: Decrease the current policing rate of corresponding ingress queue by the amount computed in Step 3c:
   PCurrent$_i^C$ = Maxof((PCurrent$_i^C$ − RateReduction$_{i,j}^C$), PMin$_i^C$).
 }
 else if $(LQ_j^C \leq Norm_j^C)$
 { //Recover policing rate of ingress queues
  For each ingress queue that is sending traffic to this egress queue: {
   If (PCurrent$_i^C$ < PMax$_i^C$) {
    PCurrent$_i^C$ = PCurrent$_i^C$ + λPCurrent$_i^C$
    where λ = 1.1
    if (PCurrent$_i^C$ > PMax$_i^C$)
     PCurrent$_i^C$ = PMax$_i^C$
   }
  }
 }
}

Figure 2:
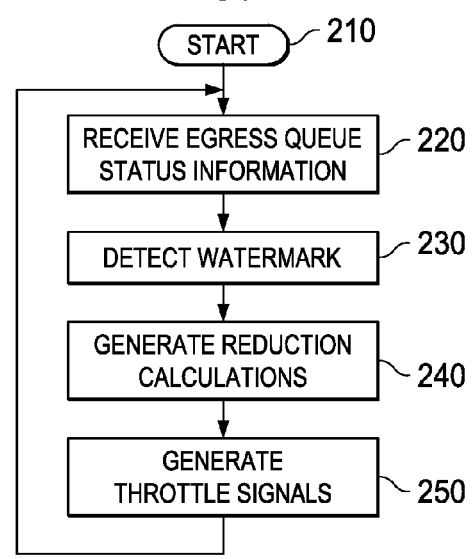
FIG. 2 is a flow diagram of one embodiment of a method of dynamically policing network traffic based on egress queue status.

FIG. 2 is a flow diagram of one embodiment of a method of dynamically policing network traffic based on egress queue status. The method begins in a start step 210.

In a step 220, information is received about the status of one or more egress queues. In various embodiments, the information indicates the extent to which the one or more egress queues are filled. In a specific embodiment, the information includes percentages of capacity by which the one or more egress queues are filled.

In a step 230, one or more watermarks are detected. In various embodiments, the one or more watermarks are predetermined fill levels of the one or more egress queues (extents to which the one or more egress queues are filled). In a specific embodiment, the one or more watermarks are predetermined percentages of the overall capacity of the egress queues. In a related embodiment, two watermarks are predetermined: a warning watermark and a congestion watermark. In the illustrated embodiment, a pushback process (which may or may not include aspects of the pushback process described above) is initiated upon detection of a watermark with respect to at least one of the one or more egress queues.

In a step 240, reduction calculations are generated. In various embodiments, the reduction calculations include amounts by which the policing rate of one or more ingress queues is to be reduced. In a specific embodiment, the reduction calculations are percentages by which the policing rate of one or more ingress queues is to be reduced. In the illustrated embodiment, the reduction calculations affect the policing rate of every ingress queue providing traffic to the egress queue that reached a watermark is reduced. In one embodiment, the reduction calculations call for a reduction of the policing rate of every ingress queue providing traffic to the egress queue that reached a watermark by an amount proportional to the overall ingress traffic rate.

In a step 250, throttle signals are generated. In the illustrated embodiment, the policing rate of every ingress queue providing traffic to the egress queue that reached a watermark is reduced. In one embodiment, the policing rate of every ingress queue providing traffic to the egress queue that reached a watermark is reduced by an amount proportional to the overall ingress traffic rate.

Processing returns to the step 220 in which further egress queue information is received. Further watermarks may be detected, or watermarks that were previously detected may vanish. In the illustrated embodiment, new warnings or congestion watermarks may be detected, or an egress queue that had generated a warning watermark may later generate a congestion watermark. In the illustrated embodiment, an egress queue that had generated a congestion watermark may later generate a warning watermark, or a warning or congestion watermark that had previously been detected may be resolved or removed. In response, further calculations may take place that increase the policing rate or one or more ingress queues, perhaps of those providing traffic to the egress queue that had eased, perhaps by an amount proportional to the overall ingress traffic rate, or perhaps both.

Figure 3:
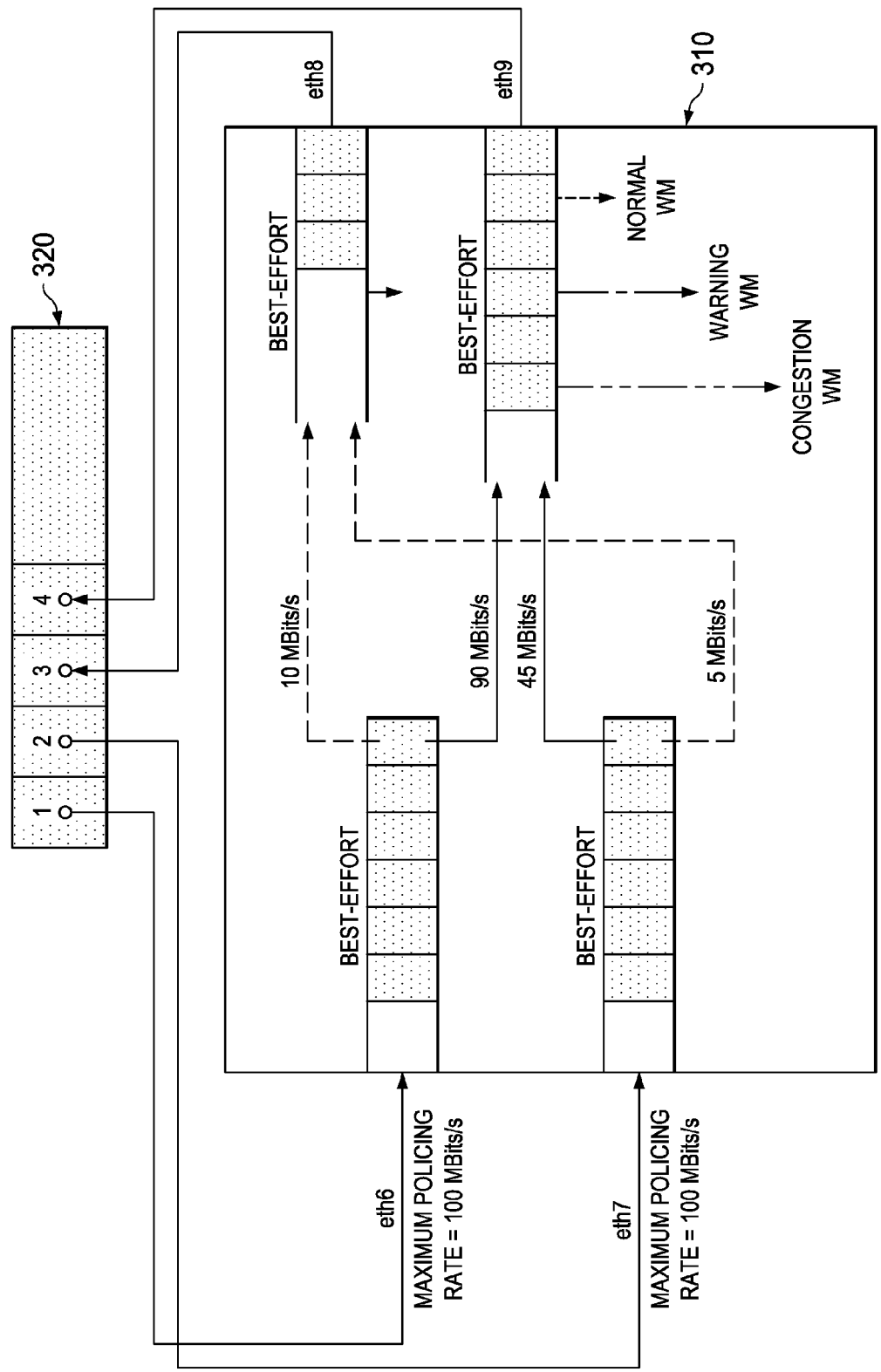
FIG. 3 is a diagram illustrating an example node and associated ingress and egress queues thereof.

Returning again to Table 3, the pushback process embodiment detailed therein may be better understood with the help of an example. FIG. 3 is a diagram illustrating an example node 310 and associated ingress and egress queues thereof. For simplicity, FIG. 3 shows only four ingress and egress interfaces with best effort ingress and egress queues. Each interface (eth6, eth7, eth8, and eth9) has a link capacity of 100 MBits/sec.

A network traffic simulator 320 commercially available from Spirent Communications known as "SmartBits" is used for traffic generation. The traffic simulator 320 is able to simulate how the node interacts with the remainder of the network (e.g., the network 100 of FIG. 1). Therefore, the simulator has output ports (1, 2) that provide ingress to the node 310 and input ports (3, 4) that accept egress from the node 310. In the example, four best-effort traffic flows are created as shown in Table 4, below.

TABLE 4

Description of Traffic Flows

| Flow Name | Traffic Rate | Simulator Ports | Node Interfaces | DSCP |
|---|---|---|---|---|
| eth6-9 | 90 MBits/sec | 1 –> 4 | eth6 –> eth9 | 0 |
| eth6-8 | 10 MBits/sec | 1 –> 3 | eth6 –> eth8 | 0 |
| eth7-9 | 45 MBits/sec | 2 –> 4 | eth7 –> eth9 | 0 |
| eth7-8 | 5 MBits/sec | 2 –> 3 | eth7 –> eth8 | 0 |

Port eth6 sends 90 MBits/s of best-effort traffic to port eth9 and 10 MBits/s of best-effort traffic to port eth8. Port eth7 sends 45 MBits/s of best-effort traffic to port eth9 and 5 MBits/s of best-effort traffic to port eth8.

The queue length of the egress queue on port eth9 exceeds the congestion watermark, and hence the pushback process is executed. The pushback process reads the average output rate of the best-effort queue on port eth9 and the congestion pushback percentage and determines the desired rate for this queue.

Assuming the average output rate for the eth9 best-effort egress queue is 100 MB/s and the congestion pushback percentage is configured as 10%, the desired rate for this queue is:

$$DesiredRate = \frac{AverageOutputRate}{\frac{1}{1 - congestionPushBackPercentage/100}}$$

$$DesiredRate = \frac{100}{\frac{1}{1 - 0.10}} = \frac{100}{1.1} = 90.90 \text{ Mbits/sec}$$

This means that the current output rate is 100 MBits/s and to reduce congestion, the output rate should be reduced to 90.90 MBits/sec. To achieve this, the total input rate of traffic going into the eth9 best-effort egress queue should be reduced to 909.09 MB/sec.

The total current input rate for the eth9 best-effort egress queue is 90 MBits/sec+45 MBits/sec=135 MBits/sec. Therefore, the input rate should be reduced by 135−90.90=44.09 MBits/sec.

In one embodiment, the ingress queues are pushed back based on the relative rates at which they are sending traffic. Thus, in this example, the traffic coming from port eth6 to port eth9 should be reduced in accordance with the following: the input traffic rate from the eth6 best-effort ingress queue to the eth9 best-effort egress queue is divided by the total input traffic rate into the eth9 best-effort egress queue, and then the quotient is multiplied by the required reduction in input rate, viz.:

(95/135)*44.09=31.02 MBits/sec.

Also according to this example, the traffic coming from port eth7 to port eth9 should be reduced in accordance with the following: the input traffic rate from the eth7 best-effort ingress queue to the eth9 best-effort egress queue is divided by the total input traffic rate into the eth9 best-effort egress queue, and then the quotient is multiplied by the required reduction in input rate, viz.:

(45/135)*44.09=14.37 MBits/sec.

The ingress queues are then throttled back by decreasing the policing rate. The policing rate for the eth6 best-effort ingress queue is set to 100−31.02=69.98 MBits/sec. The policing rate for the eth7 best-effort ingress queue is set to 100−14.37=85.63 MBits/sec.

The ingress policing of the best-effort traffic on both ports eth6 and eth7 reduces the traffic that is going to both ports eth8 and eth9. By reducing the ingress policing rate on ports eth6 and eth7, the flows eth6-7 and eth7-8 are also dropped at ingress. The reduction in flows eth6-7 and eth7-8 is not fair, because these flows are not causing congestion. However this cannot be avoided in DiffServ-based QoS, because policing is done per traffic type, not per flow.

Those skilled in the art to which this application relates will appreciate that other and further additions, deletions, substitutions and modifications may be made to the described embodiments.

What is claimed is:

1. A system for dynamically policing network traffic based on egress queue status, comprising:
 a policing engine configured to receive egress queue status information; and
 a pushback calculator associated with said policing engine and configured to produce a reduction calculation based on said egress queue status information, said policing engine further configured to produce a throttle signal to reduce a traffic policing rate of an ingress queue wherein said egress queue status information includes a percentage of capacity by which an egress queue is filled.

2. The system as recited in claim 1 wherein said policing engine is further configured to employ said egress queue status information to detect at least one watermark selected from the group consisting of:
 a warning watermark, and
 a congestion watermark.

3. The system as recited in claim 1 wherein said reduction calculation is a percentage by which said traffic policing rate is to be reduced.

4. The system as recited in claim 1 wherein said pushback calculator produces a reduction calculation for every ingress queue providing traffic to a particular egress queue.

5. The system as recited in claim 1 wherein said policing rate operates with respect to traffic classes.

6. A method of dynamically policing network traffic based on egress queue status, comprising:
 receiving egress queue status information;
 producing a reduction calculation based on said egress queue status information, wherein said egress queue status information includes a percentage of capacity by which an egress queue is filled; and
 producing a throttle signal to reduce a traffic policing rate of an ingress queue,
 wherein said receiving and producing are performed by a processor.

7. The method as recited in claim 6 further comprising employing said egress queue status information to detect at least one watermark selected from the group consisting of:
 a warning watermark, and
 a congestion watermark.

8. The method as recited in claim 6 wherein said reduction calculation is a percentage by which said traffic policing rate is to be reduced.

9. The method as recited in claim 6 further comprising repeating said producing said reduction calculation for every ingress queue providing traffic to a particular egress queue.

10. The method as recited in claim 6 wherein said traffic policing rate operates with respect to traffic classes.

11. A network node in a network that employs DiffServ-based QoS, comprising:
- a plurality of ingress queues;
- a plurality of egress queues;
- a policing engine configured to receive status information regarding said plurality of egress queues; and
- a pushback calculator associated with said policing engine and configured to produce a reduction calculation based on said egress queue status information for at least of said plurality of ingress queues, said policing engine further configured to produce a throttle signal to reduce a traffic policing rate of said at least one of said plurality of ingress queues and wherein said egress queue status information includes a percentage of capacity by which an egress queue is filled.

12. The node as recited in claim 11 wherein said policing engine is further configured to employ said egress queue status information to detect at least one watermark selected from the group consisting of:
- a warning watermark, and
- a congestion watermark.

13. The node as recited in claim 11 wherein said reduction calculation is a percentage by which said traffic policing rate is to be reduced.

14. The node as recited in claim 11 wherein said pushback calculator produces a reduction calculation for every one of said plurality of ingress queues providing traffic to a particular one of said plurality of egress queues.

15. The system as recited in claim 1 wherein said reduction calculation calls for a reduction in traffic policing rate proportional to an overall ingress rate.

16. The method as recited in claim 6 wherein said reduction calculation calls for a reduction in traffic policing rate proportional to an overall ingress traffic rate.

17. The node as recited in claim 11 wherein said reduction calculation calls for a reduction in traffic policing rate proportional to an overall ingress traffic rate.

* * * * *